(12) United States Patent
Gries

(10) Patent No.: US 9,296,276 B2
(45) Date of Patent: Mar. 29, 2016

(54) ELECTRIC HEATER

(71) Applicant: MAHLE International GmbH, Stuttgart (DE)

(72) Inventor: Jean-Philippe Gries, Colmar (FR)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 14/518,585

(22) Filed: Oct. 20, 2014

(65) Prior Publication Data

US 2015/0108111 A1 Apr. 23, 2015

(30) Foreign Application Priority Data

Oct. 22, 2013 (EP) ..................................... 13290251

(51) Int. Cl.
*H05B 1/02* (2006.01)
*B60H 1/22* (2006.01)
(Continued)

(52) U.S. Cl.
CPC ............ *B60H 1/2225* (2013.01); *F24H 3/0429* (2013.01); *F24H 3/0435* (2013.01); *F24H 3/0441* (2013.01); *F24H 9/1872* (2013.01); *H05B 1/0236* (2013.01); *H05B 3/24* (2013.01); *F24H 2250/04* (2013.01); *H05B 2203/02* (2013.01); *H05B 2203/023* (2013.01)

(58) Field of Classification Search
CPC .. B60H 1/2225; H05B 1/0236; H05B 1/0238; H05B 3/141; H05B 3/12; H05B 3/18; H05B 3/50; H05B 2203/02; F24H 3/0429; F24H 3/0455; F24H 3/0441; F24H 9/1872; F24H 2205/04

USPC ......... 219/202, 203, 494, 486, 504, 539, 542, 219/543

See application file for complete search history.

(56) References Cited

U.S. PATENT DOCUMENTS

| | | | | |
|---|---|---|---|---|
| 6,720,536 | B2 * | 4/2004 | Bohlender | .................... 219/504 |
| 6,875,962 | B2 * | 4/2005 | Uhl et al. | ...................... 219/530 |
| 2015/0034626 | A1 * | 2/2015 | Kominami et al. | ........... 219/483 |

FOREIGN PATENT DOCUMENTS

| | | |
|---|---|---|
| DE | 199 25 757 A1 | 12/2000 |
| DE | 199 33 013 A1 | 2/2001 |

(Continued)

OTHER PUBLICATIONS

European Search Report for European Application No. 13290251.1 dated Apr. 1, 2014.

*Primary Examiner* — Mark Paschall
(74) *Attorney, Agent, or Firm* — Muncy, Geissler, Olds & Lowe, P.C.

(57) ABSTRACT

An electric heater for an automobile vehicle, with an electronic controller and a heat transmitting net, whereby the heat transmitting net contains a multitude of PTC-heating elements, a multitude of contact sheets, a multitude of heat dissipating fins and a multitude of distance elements. At least one PTC-heating element and at least one distance element is arranged between two adjacent contact sheets, whereby the PTC-heating elements and the distance elements between the adjacent contact sheets and the adjacent contact sheets themselves form a heating element, whereby the heating elements are connected to the electronic controller through connectors, which are arranged at the electronic controller and are connected to a power supply, whereby the heat transmitting net is divided in a first area, which contains only distance elements, and a second area, which contains PTC-heating elements and/or distance elements.

11 Claims, 2 Drawing Sheets

(51) Int. Cl.
*F24H 3/04* (2006.01)
*F24H 9/18* (2006.01)
*H05B 3/24* (2006.01)

(56) References Cited

FOREIGN PATENT DOCUMENTS

| | | |
|---|---|---|
| EP | 1 340 637 A2 | 9/2003 |
| EP | 1 926 346 A1 | 5/2008 |
| EP | 1 926 347 A1 | 5/2008 |

\* cited by examiner

ELECTRIC HEATER

This nonprovisional application claims priority under 35 U.S.C. §119(a) to European Patent Application No. EP 13290251.1, which was filed on Oct. 22, 2013, and which is herein incorporated by reference.

BACKGROUND OF THE INVENTION

1. Field of the Invention

The present invention relates to an electric heater for an automobile vehicle. The electric heater can include an electronic controller and a heat transmitting net, whereby the heat transmitting net contains a multitude of PTC-heating elements, a multitude of contact sheets, a multitude of heat dissipating fins and a multitude of distance elements, whereby at least one PTC-heating element and at least one distance element is arranged between two adjacent contact sheets, whereby the PTC-heating elements and the distance elements between the adjacent contact sheets and the adjacent contact sheets themselves form a heating element, whereby the heating elements are connected to the electronic controller through connectors, which are arranged at the electronic controller and are connected to a power supply 2. Description of the Background Art Description of the Background Art An electric heater can be used to further enlarge the heating capacity of a heating system in automobiles. Electric heaters can feature a multitude of positive temperature coefficient (PTC) elements, that can be used to transform electric energy into heat energy, which can be used to heat up an airflow within a HVAC-system (heating, ventilation and air conditioning).

Electric heaters usually feature an electronic controller, which allows the activation and deactivation of the electric heater. The electronic controller can therefore be connected to other data-processing elements within the control-network of a vehicle. Thereby it is possible to control the electric heater with respect to the working state of the rest of the control-network.

PTC-heaters known in the conventional art usually feature an additional part or element, which is used to dissipate the heat that is generated by the electronic controller. This element can be heat dissipating fins, a ventilation fan or channels, which are cooled by a circulating fluid.

It is disadvantageous, that the additional part or element increases the weight of the electric heater and furthermore adds up to the overall complexity of the electric heater. Therefore the electric heater will be more expensive. Furthermore the assembly of the electric heater will be negatively influenced by the additional parts or elements.

SUMMARY OF THE INVENTION

It is therefore an object of the present invention to provide an electric heater, which offers an option to dissipate heat from an electronic controller without adding complex additional parts to the electric heater and thus increasing the complexity of the electric heater.

According to an embodiment of the invention an electric heater for an automobile vehicle, with an electronic controller and a heat transmitting net is provided, whereby the heat transmitting net contains a multitude of PTC-heating elements, a multitude of contact sheets, a multitude of heat dissipating fins and a multitude of distance elements, whereby at least one PTC-heating element and at least one distance element is arranged between two adjacent contact sheets, whereby the PTC-heating element and the distance element between the adjacent contact sheets and the adjacent contact sheets themselves form a heating element, whereby the heating elements are connected to the electronic controller through connectors, which are arranged at the electronic controller and are connected to a power supply, whereby the heat transmitting net is divided in a first area, which contains only distance elements, and a second area, which contains PTC-heating elements and/or distance elements.

The first area of the heat transmitting net can contain only distance elements. Air can flow through the first area of the heat transmitting net and overflow the contact sheets, which are connected to the electronic controller. By this overflow the heat generated by the electronic controller can be dissipated from the electric heater. The first area of the heat transmitting net is therefore predominantly a cooling area for the electronic controller.

The second area of the heat transmitting net can contain a multitude of PTC-heating elements, which can be used to heat up an airflow, which can flow through the second area of the heat transmitting net. The second area of the heat transmitting net is therefore predominantly a heating area for the passing airflow.

The separation of the electric heater in a cooling area and a heating area is beneficial, because it increases the efficiency of the electric heater and allows the electric controller to be maintained at a safe temperature level, without adding additional parts to the electric heater.

The distance elements can be shaped exactly or substantially like the PTC-heating elements. They are used to keep the distance between the two adjacent contact sheets of a heating element, which is caused by the PTC-heating elements in the second area. The distance elements act as placeholders, which can be used instead of the PTC-heating elements without changing the general buildup of the electric heater. Since the distance elements are predominantly positioned within the first area and furthermore do not generate heat, the first area of the heat transmitting net can be used as a cooling area for the electronic controller.

The identical shape of the distance elements and the PTC-heating elements is advantageous as usually a positioning frame is used to keep the variety of distance elements and PTC-heating elements in place between the contact sheets of each heating element. The identical shape offers the possibility to replace PTC-heating elements by distance elements without the need for further adaption. The order of distance elements and PTC-heating elements within a single heating element can thus be changed freely without geometric restrictions.

The first area can be arranged at the end of the heat transmitting net, which faces the electronic controller, whereas the second area is arranged at the end of the heat transmitting net, which is facing away from the electronic controller.

This is advantageous as the first area is used as a cooling area for the electronic controller. The size of the first area of the heat transmitting net depends of the size and the quantity of distance elements that are arranged within the first area of the heat transmitting net. The first area can have different extensions across the width of the heat transmitting net depending on the distribution of the distance elements within the heating elements respectively. Therefore the separation line between the first area and the second area of the heat transmitting net can e.g. run in a right angle to the heating elements, can have a zig-zagging-shape or a roof-shape.

Additionally it is advantageous, if the electronic controller features heat dissipating elements that extend into the first area of the heat transmitting net.

The contact sheets, which are connected to the connectors of the electronic controller, act as heat dissipating elements. To increase the heat dissipation additional heat dissipating elements, such as fins, can protrude from the electronic controller and extend into the first area of the heat transmitting net. This is beneficial as more heat can be dissipated from the electronic controller. The additional heat dissipating elements can preferably be positioned between the connectors and should be connected to the heat generating parts of the electronic controller in a thermally conductive way.

Furthermore it is beneficial, if the PTC-heating elements are distributed symmetrically with respect to a centerline, which divides the heat transmitting net in a left area and a right area, whereby the centerline runs parallel to the contact sheets from the end of the heat transmitting net, which faces the electronic controller, to the far side of the heat transmitting net.

A symmetrical distribution is beneficial to obtain a constant heat distribution across the heat transmitting net. Furthermore it is advantageous as the assembly of a heat transmitting net with a symmetrical distribution is much easier.

Further, the heating elements can be activated individually through the electronic controller.

Through the possibility to activate the heating elements individually, a higher flexibility can be achieved as either heating elements with a higher heat generating capacity or heating elements with a lower heat generating capacity or a combination of both types of heating elements can be activated. This gives the possibility to adjust the heat output of the electric heater to the heat demand of the HVAC-system.

By the possibility to activate the heating elements individually, the heat generated within the electric heater can easily be adapted to the requirements. This can be done by simple switches, which allow activating or deactivating the individual heating elements. This is beneficial as the electronic controller can be designed less complex.

If all heating elements would offer the same heat generating capacity, it would be much more challenging to adapt the heat generation, as a PWM (pulse width modulation) signal would be needed to adapt the heat generation. With a PWM signal it is possible to activate the PTC-heating elements in a pulsed way only for a certain amount of time, which offers the possibility to regulate and adapt the heat generation. The design and buildup of an electronic controller, which is capable of emitting a PWM signal, is much more complex.

Besides that it is beneficial, if a heating element contains distance elements and PTC-heating elements in an alternating order.

An alternating order is advantageous, as it offers the possibility to achieve a more homogenous heat distribution across the heat transmitting net and helps to avoid hot-spots within the heat transmitting net. The PTC-heating elements and the distance elements in adjacent heating elements can be offset relative to each other in a way that distance elements and PTC-heating elements are arranged in an alternating order in horizontal direction and in vertical direction. This helps to avoid hot-spots within the heat transmitting net. A homogenous heat distribution supports a homogenous heat-up of the airflow, which is flowing through the heat transmitting net, which increases the efficiency of the electric heater.

Furthermore, the PTC-heating elements can be spaced apart in a horizontal direction and/or in a vertical direction across the heat transmitting net by distance elements.

A distribution of the PTC-heating elements in the heat transmitting net, where the PTC-heating elements are spaced apart by distance elements, is beneficial to achieve an even more homogenous heat distribution, as a cluster of a multitude of PTC-heating elements can be avoided. The distribution, which is ultimately realized in an electric heater, is predominantly dependent from the outside requirements, which are among others the maximum needed heat or the minimum heat-up time for an airflow.

In an alternative embodiment it is beneficial, if at least two distance elements are arranged adjacent to each other in horizontal direction and/or in vertical direction to create a cooler spot within the heat transmitting net.

A cooler spot, which can be achieved by placing a multitude of distance elements next to each other, is beneficial to create areas with a lower heat generating capacity, which can build cool-spots on the heat transmitting net. Such cool-spots can help to dissipate heat, e.g. from the electronic controller, via the heat transmitting net.

The distance elements can be electrically not conductive.

As the distance elements are placed between the contact sheets and are in direct contact with the contact sheets, it is preferable, if the distance elements are electrically not conductive, to avoid short circuits.

Furthermore, each heating element can be electrically connected to a positive pole of a power supply and a negative pole of a power supply, whereby a heat transmitting fin acts as a conductive bridge between two adjacent contact sheets. By using the heat transmitting fins as a conductive bridge, it is possible to connect all heating elements to a positive connector and a negative connector, whereby the quantity of connectors can be smaller than the quantity of contact sheets. Hence the quantity of needed parts is smaller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
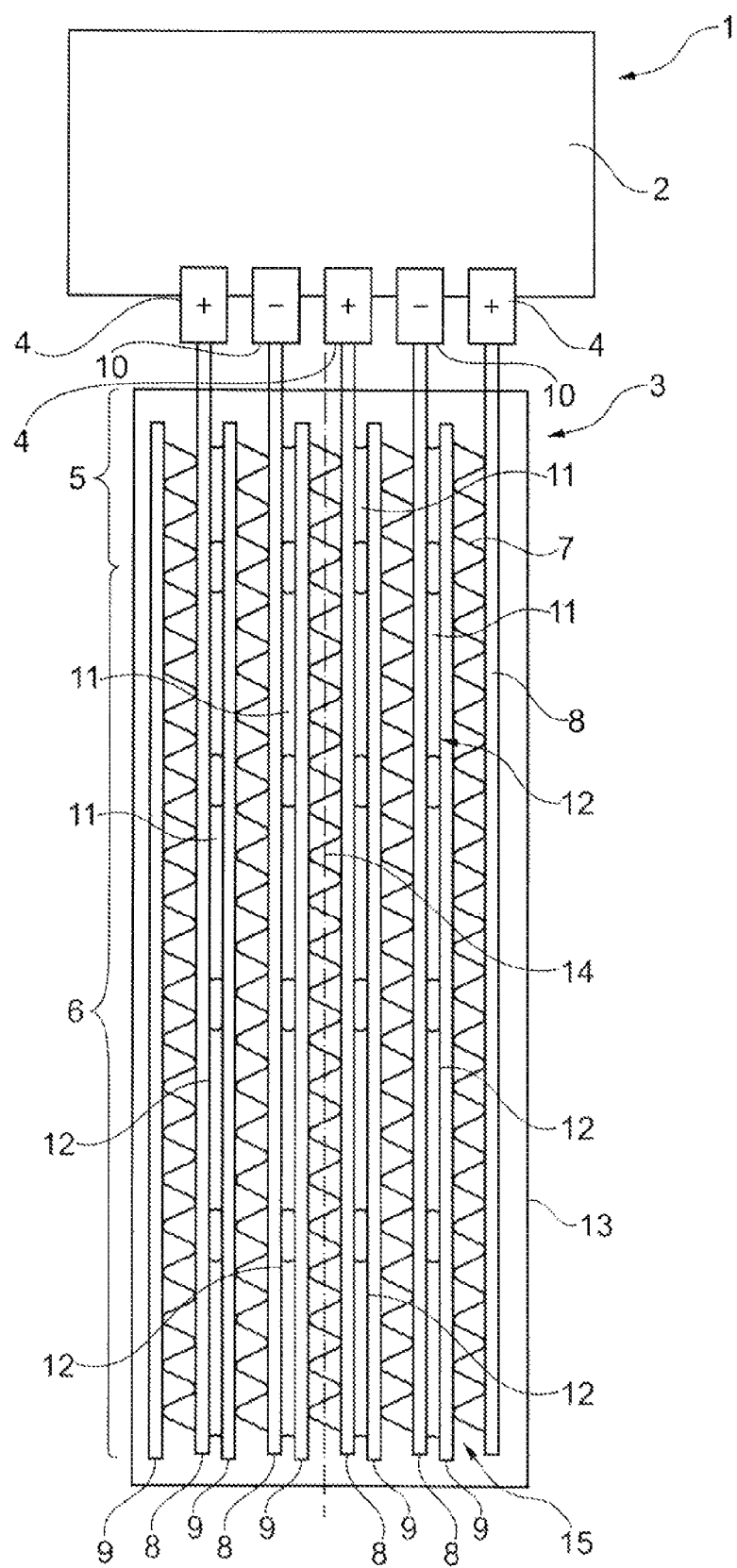
FIG. 1 shows a view of an electric heater, which has a heat transmitting net and an electronic controller, whereby the heat transmitting net features a multitude of PTC-heating elements and a multitude of distance elements, which are distributed across the heat transmitting net.

FIG. 1 shows a view of an electric heater 1. The electric heater 1 features an electronic controller 2, which is used to control the electric heater 1, and a heat transmitting net 3. The electronic controller 2 is connected to a power supply (not shown in FIG. 1). At the lower end of the electronic controller 2 a multitude of connectors 4, 10 is shown. The connectors marked with the reference number 4 are connected to a positive pole of a power supply. The connectors marked with the reference number 10 are connected to a negative pole of a power supply. The connectors 4, 10 are arranged in an alternating order at the lower end of the electronic controller 2.

The heat transmitting net 3 features a multitude of heating elements 15, which has a contact sheet 8 and a contact sheet 9. Furthermore a multitude of PTC-heating elements 12 and distance elements 11 is arranged between the contact sheets 8, 9. The contact sheets 8 are connected to either a positive connector 4 or a negative connector 10. Each contact sheet 9 is connected to the contact sheet 8 of the heating element 15, which is adjacent to it on the right side. The connection between the contact sheets 8, 9 is created through the heat dissipating fins 7, which are arranged between the heating elements 15 and act as a conductive bridge. The contact sheets 8, 9 and the heat dissipating fins 7 are conductive. Through the connection of the contact sheets 8 with the connectors 4, 10 and the connection of the contact sheets 9 with the contact sheets 8 of the adjacent heating element 15, it is realized that the PTC-heating elements 12 between the contact sheets 8, 9 are connected to a power supply within a closed electrical circuit. Thus the PTC-heating elements 12 can generate heat by applying an electric current to them.

The positive connectors 4 and the negative connectors 10 are arranged in an alternating order along a row at the bottom side of the electronic controller 2. The number of positive connectors 4 is three and the number of negative connectors 10 is 2. A different distribution between positive and negative connectors can be realized in alternative embodiments.

The heat transmitting net 3 is divided in two areas 5, 6. The first area 5 is located at the side of the heat transmitting net 3, which faces the electronic controller 2. The second area is located at the far side of the heat transmitting net 3.

Only distance elements 11, which cannot generate heat, are arranged within the first area 5. Within the second area 6 distance elements 11 and PTC-heating elements 12 are arranged within the heating elements 15. The heating elements 15 at the left end and the right end of the heat transmitting net 3 contain four PTC-heating elements 12 and one distance element 11. The two heating elements 15 in the middle of the heat transmitting net 3 contain two PTC-heating elements 12 and three distance elements 11 respectively. A different distribution of PTC-heating elements and distance elements in the heating elements can be realized in alternative embodiments.

The first area 5 is used to dissipate the heat generated by the electronic controller 2. The heat is submitted into the first area 5 via the contact sheets 8 that are connected to the connectors 4, 10. An airflow that flows through the first area 5 dissipates the heat away from the contact sheets 8. The heat dissipating fins 7, the distance elements 11 and the contact sheets 9, which are located in the first area 5, can also contribute to the dissipation of the heat from the electronic controller 2, as they have a thermally conductive connection to the contact sheets 8. As the first area 5 predominantly helps to cool the electronic controller 2 it is also called cooling area 5.

The second area 6, which features the PTC-heating elements 12, is used to generate heat by the activation of the heating elements 15. The second area 6 is therefore also called heating area 6. The number of distance elements 11 used within the heating area 6 influences the maximum heat generating capacity of each heating element 15 respectively and thus the maximum heat generating capacity of the whole electric heater 1. Furthermore the heat distribution across the heat transmitting net 3 can be changed by the number and position of the distance elements 11 within the heating elements 15 and the heat transmitting net 3 of the electric heater 1.

The heat transmitting net 3 or at least the heating elements 15 are arranged symmetrical to the centerline 14, which runs parallel to the contact sheets 8, 9. Due to this symmetrical buildup the heat transmitting net 3 can be connected to the electronic controller 2 without respect to the relative orientation between the electronic controller 2 and the heat transmitting net 3. As long as the contact sheets 8 can be connected to the electronic controller 2 via the connectors 4 and 10 it is unimportant, whether the heat transmitting net is flipped around 180° around the centerline 14 or not.

The heat transmitting net 3 can be cased within a frame 13, which helps to position the heat transmitting net 3 against surrounding structures in the vehicle or the HVAC-system. Furthermore the frame 13 increases the stability of the electric heater 1.

The heating elements 15 can easily be switched on or off independently from each other. This gives the possibility to realize different heating scenarios. These different heating scenarios are depending on the number of PTC-heating elements 12 within the individual heating elements 15. The heating scenarios differ in the generated heat and the heat distribution across the heat transmitting net 3.

Figure 2:
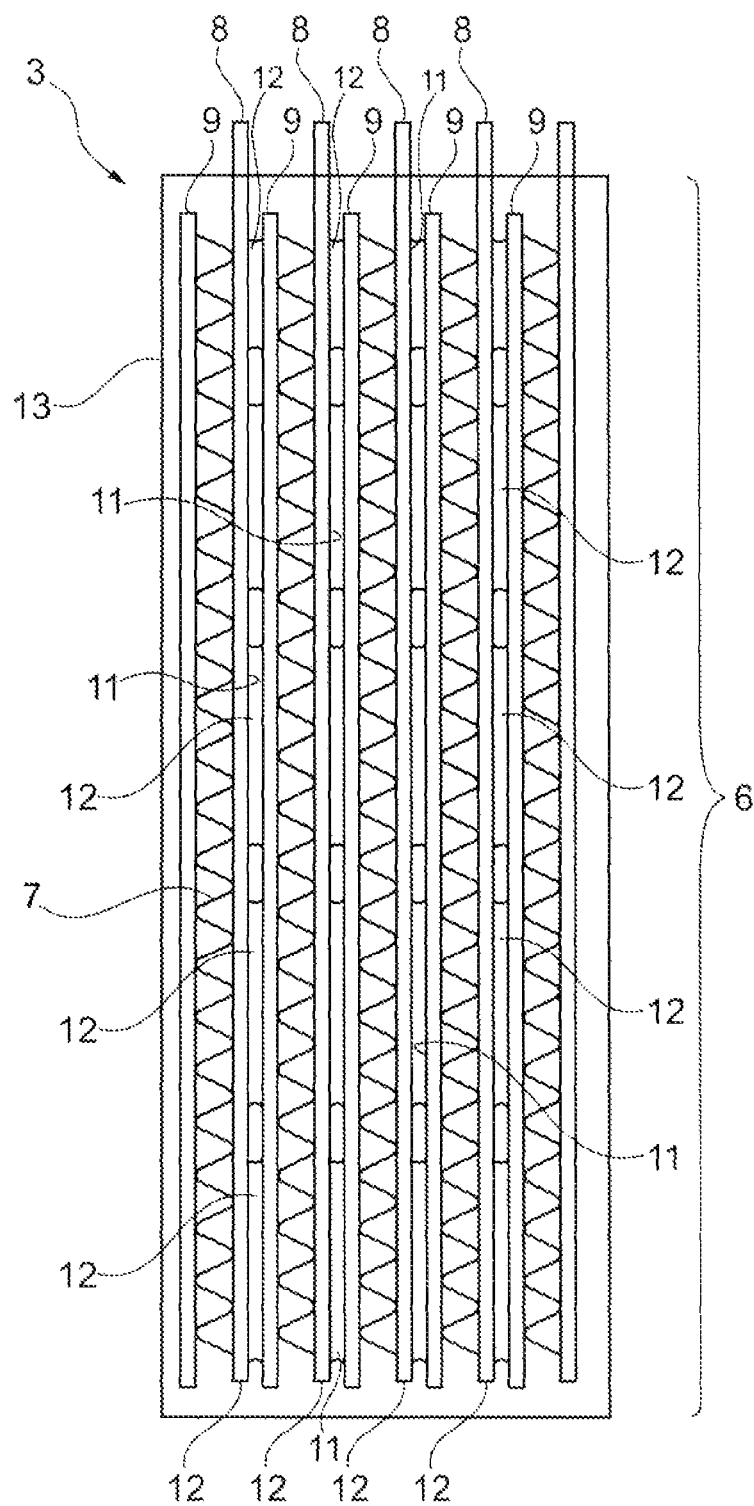
FIG. 2 shows the heating part of the heat transmitting net with an alternative distribution of PTC-heating elements and distance elements.

FIG. 2 shows the second area 6 of a heat transmitting net, whereby the distribution of the PTC-heating elements 12 and the distance elements 11 is changed. In FIG. 2 the two heating elements 15 in the middle are showing distance elements 11 and PTC-heating elements 12 in an alternating order, whereby the right heating element 15 of the two has a distance element 11 on top, which is followed downwards by a PTC-heating element 12 and so on. The left heating element 15 in the middle of the heat transmitting net 3 shows a PTC-heating element 12 on top, which is followed downward by a distance element 11 and so on. The two heating elements 15 in the middle thereby offer an alternating order of PTC-heating elements 12 and distance elements 11.

By replacing PTC-heating elements 12 with distance elements 11 and vice versa, different heat distributions across the heat transmitting net can be achieved. This can help to avoid hot-spots within the heat transmitting net 3 and lead to a better heat distribution.

The distribution of PTC-heating elements 12 and distance elements 11 can be changed almost freely without any restrictions, depending on the most preferred heat distribution.

While the invention has been shown in FIG. 1 in a preferred embodiment, it will be clear to those skilled in the arts to which it pertains that a variety of modifications and changes can be made thereto without departing from the scope of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric heater for an automobile vehicle, the electric heater comprising:
  an electronic controller; and
  a heat transmitting net comprising:
    a plurality of PTC-heating elements;
    a plurality of contact sheets;
    a plurality of heat dissipating fins; and
    a plurality of distance elements,
  wherein at least one PTC-heating element and at least one distance element is arranged between two adjacent contact sheets,
  wherein the PTC-heating elements and the distance elements between the adjacent contact sheets and the adjacent contact sheets themselves form a heating element, wherein the heating elements are connected to the electronic controller through connectors that are arranged at the electronic controller and are connected to a power supply, wherein the heat transmitting net is divided into a first area, which contains only distance elements, and into a second area, which contains PTC-heating elements and/or distance elements, and wherein the first area is arranged at a first end of the heat transmitting net that is closest to the electronic controller, and the second area is arranged adjacent to the first area and extends to a second end of the heat transmitting net that is opposite the first end of the heat transmitting net, such that the second area is positioned farther away from the electronic controller than the first area.

2. The electric heater according to claim 1, wherein the electronic controller has heat dissipating elements that extend into the first area of the heat transmitting net.

3. The electric heater according to claim 1, wherein the PTC-heating elements are distributed substantially symmetrically with respect to a centerline, which divides the heat transmitting net in a left area and a right area, and wherein the centerline runs parallel to the contact sheets from the first end of the heat transmitting net to the second end of the heat transmitting net.

4. The electric heater according to claim 1, wherein the heating elements are activatable individually through the electronic controller.

5. The electric heater according to claim 1, wherein a heating element contains the distance elements and the PTC-heating elements in an alternating order.

6. The electric heater according to claim 1, wherein the PTC-heating elements are spaced apart in a horizontal direction and/or in a vertical direction across the heat transmitting net by distance elements.

7. The electric heater according to claim 1, wherein at least two distance elements are arranged adjacent to each other in a horizontal direction and/or in a vertical direction to create a cooler spot within the heat transmitting net.

8. The electric heater according to claim 1, wherein the distance elements are electrically not conductive.

9. The electric heater according to claim 1, wherein each heating element is electrically connected to a positive pole of a power supply and a negative pole of a power supply, and wherein a heat transmitting fin acts as a conductive bridge between two adjacent contact sheets.

10. The electric heater as claimed in claim 1, wherein the heat transmitting net has an even number of contact sheets.

11. The electric heater as claimed in claim 1, wherein the contact sheets are divided into pairs of contact sheets, wherein a first contact sheet of each pair of contact sheets is connected to a respective connector and wherein the heat dissipating fins are provided between the first contact sheet and a second contact sheet of each pair of contact sheets.

* * * * *